United States Patent [19]

Miyazaki et al.

[11] 4,401,370
[45] Aug. 30, 1983

[54] LEAD-IN ELECTRODE STRUCTURE FOR ELECTROCHROMIC DISPLAYS OF THE SEGMENTED TYPE

[75] Inventors: Takaaki Miyazaki; Sadakatsu Hashimoto; Mitsuru Nishiyama, all of Nara, Japan

[73] Assignee: Sharp, Osaka, Japan

[21] Appl. No.: 168,248

[22] Filed: Jul. 10, 1980

[30] Foreign Application Priority Data

Jul. 12, 1979 [JP] Japan .................. 54-96372[U]

[51] Int. Cl.³ .................................. G02F 1/17
[52] U.S. Cl. ........................................ 350/357
[58] Field of Search ..................... 350/357, 363; 219/121 LJ

[56] References Cited

U.S. PATENT DOCUMENTS

| | | | |
|---|---|---|---|
| 3,947,801 | 3/1976 | Bube | 219/121 LJ |
| 4,153,344 | 5/1979 | Hamada et al. | 350/357 |
| 4,210,390 | 7/1980 | Yaguchi | 350/357 |
| 4,331,386 | 5/1982 | Minami | 350/357 |

Primary Examiner—James W. Davie
Attorney, Agent, or Firm—Birch, Stewart, Kolasch & Birch

[57] ABSTRACT

An electrochromic display device comprises terminals formed on one of two substrates for connecting the electrochromic display device to a driver circuit, and one or more cut-off and lead-in electrodes each for connecting display segments to corresponding terminals. The cut-off and lead-in electrodes are adapted to have resistance values such that the results of a multiplication of each of the resistance values and the area of a corresponding one of the display segments are approximately constant as compared to remaining couples of the remaining display segments and corresponding lead-in electrodes. Each of the cut-off and lead-in electrodes has a cut-off portion not available for electrical interconnection. In another form of the present invention, the lead-in electrodes, regardless of whether or not the cut-off portion is present, are formed on a substantially entire surface of one of the two substrates so that gaps therebetween are not noticed by a visual scale.

13 Claims, 3 Drawing Figures

LEAD-IN ELECTRODE STRUCTURE FOR ELECTROCHROMIC DISPLAYS OF THE SEGMENTED TYPE

BACKGROUND OF THE INVENTION

The present invention relates to an electro-optical display containing an electrochromic material held between two electrode carrying support plates and manifesting reversible variations in light absorption properties upon application of a properly controlled voltage or current. This display is referred to as an "electrochromic display (ECD)" hereinafter.

The present invention relates, more particularly, to lead-in electrode structures connected to segment electrodes in the electrochromic display (ECD) of the segmented type.

It was well known that ECDs comprise a pair of substrates, at least one of which was transparent, a desired number of display electrodes formed on the transparent substrate, an electrochromic material film formed on the display electrodes, a counter electrode formed on at least one of the pair of substrates, and a liquid electrolyte disposed between the pair of substrates.

In such an ECD, it was preferable that the area of each of the electrochromic segments and the resistance of each lead-in electrode associated therewith be provided so that their multiplied results were approximately constant. Even when variation in their results was present, it was preferable that these variations be held within about a 10% variation. This situation still holds true at the present time.

A conventional lead-in electrode resistance controlling technique was disclosed in Hiroshi Hamada et al, U.S. Pat. No. 4,153,344, issued May 8, 1979 and assigned to the present assignee, entitled "LEAD-IN ELECTRODE STRUCTURE FOR ELECTROCHROMIC DISPLAYS OF THE SEGMENTED TYPE".

By the conventional lead-in electrode resistance controlling technique as disclosed in U.S. Pat. No. 4,153,344, however, the resistance value was changed by a method of trial and error, in particular, by amending the entire area of the lead-in electrode with the object to make the above-described multiplied results constant. Accordingly, it was not suitable for mass production.

Therefore, it is desirable to vary the resistance of the lead-in electrodes by improved techniques suitable for mass production.

SUMMARY OF THE INVENTION

Accordingly, it is an object of the present invention to provide improved techniques to be used for amending the resistance of a lead-in electrode.

It is another object of the present invention to provide a cut-off means within a lead-in electrode in order to control the resistance value of this lead-in electrode.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electrochromic display device comprises terminals formed on one of two substrates for connecting the electrochromic display device to a driver circuit, and one or more cut-off and lead-in electrodes each for connecting display segments to corresponding terminals. The cut-off and lead-in electrodes are adapted to have resistance values such that results of the multiplication of each of the resistance values and the area of the corresponding one of the display segments are approximately constant as compared to remaining products of display segment area and corresponding lead-in electrode resistance. Each of the cut-off and lead-in electrodes has a cut-off portion not available for an interconnection.

In another embodiment of the present invention, the lead-in electrodes, regardless of whether or not cut-off portions are present, are formed on substantially the entire surface of one of the two substrates so that gaps between the electrodes are not noticed by the display observer.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
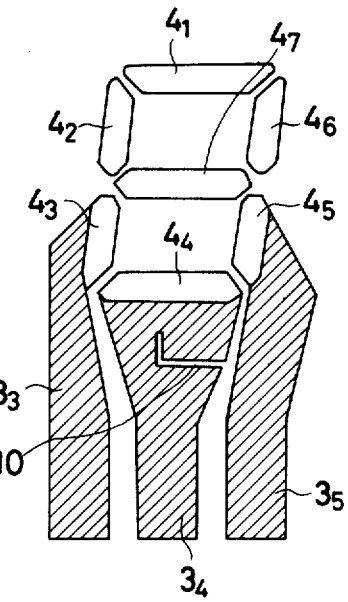
FIGS. 1 through 3 show plan views of relationships between display segments each having an electrochromic material film, and lead-in electrodes according to the present invention.
Figure 2:
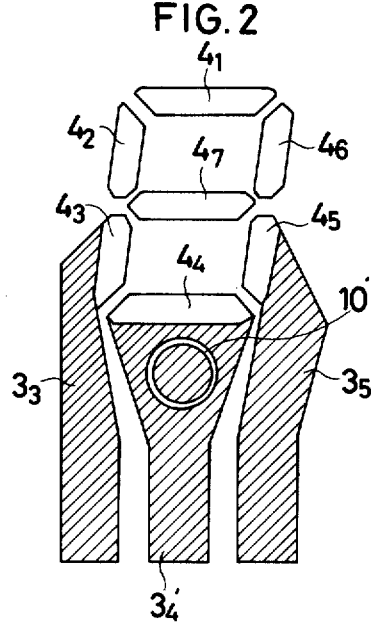
Figure 3:
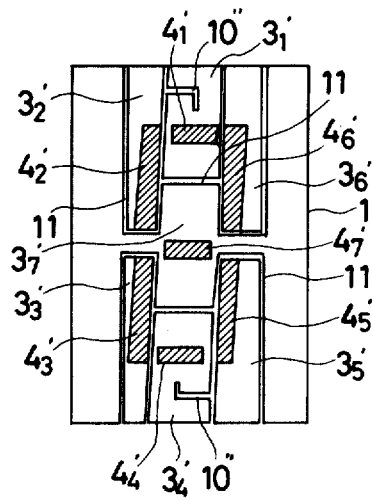

Turning now descriptively to the drawings, in which similar reference characters denote similar elements throughout the several views, FIGS. 1-3 illustrate a plan view of a relationship between display segments each having an electrochromic material film, and lead-in electrodes according to the present invention. A counter electrode (not shown here) is provided confronting the display segments.

A terminal means (not shown herein) is provided for connecting the lead-in electrodes to a driver circuit (not shown) for driving purposes. The terminal means is, preferably, formed on one of two substrates, the one of two substrates having the lead-in electrodes deposited thereon.

Since the structure and operation of such an electrochromic display device is well known to those skilled in the art as disclosed in Hiroshi Hamada U.S. Pat. No. 4,153,344, further description is omitted. U.S. Pat. No. 4,153,344 is incorporated herein by reference thereto.

The intent of the present invention is to amend a resistance value in the lead-in electrode without any change in the entire shape of a mask pattern used for making the lead-in electrodes. An area of each of the display segments having the electrochromic material film and the resistance value of the lead-in electrode connected to each of the display segments are provided so that their multiplied results are approximately constant.

In particular, with reference to FIGS. 1 and 2, there are shown electrochromic material films $4_1$ to $4_7$, lead-in electrodes $3_3$ to $3_5$ and $3_4'$, and cut-off portions 10 and 10'. The lead-in electrodes $3_3$ to $3_5$ and $3_4'$ are electrically connected to each of the electrochromic material films $4_3$, $4_4$ and $4_5$.

All the electrochromic material films $4_1$ to $4_7$ form display segments for a visual indication. They are disposed on display electrodes portions which are constructed as a part of the lead-in electrodes which are made of, say, $In_2O_3$ through the use of etching techniques. Although not shown in FIGS. 1 and 2, there are present lead-in electrodes connected to each of the electrochromic material films $4_1$, $4_2$, $4_6$ and $4_7$.

All parts of the lead-in electrodes not defining the display segments are coated with a suitable insulating material made of, for example, $SiO_2$, $Al_2O_3$ and synthetic resin. Suitable electrochromic materials used for the electrochromic material films are $WO_3$, $MoO_3$, $TiO_2$ and AgI.

The cut-off portion 10 is provided within the lead-in electrode $3_4$ so that the area of each of the display segments and the resistance value of each of the lead-in electrodes may be multiplied so that the results are approximately constant. The cut-off portion 10 is shaped similar to a hook.

Similarly, the cut-off portion 10' is provided within the lead-in electrode $3_4'$. The cut-off portion 10' has a circular form The shape of the cut-off portions 10 and 10' can be amended by changing etching patterns used for the lead-in electrodes $3_4$ and $3_4'$ in such a manner that the etching patterns have the cut-off portions 10 and 10'. Since it is unnecessary, according to the present invention, to amend the peripheral region of the etching patterns, entirely, production procedures therefor are simplified as compared to those in which the entire periphery of the etching patterns was changed as disclosed in U.S. Pat. No. 4,153,344.

Further objects of the cut-off portions are as follows:

1. The rapid response time of only a certain number of display segments and/or deep degree of coloration of them may be controlled. For these purposes, only a certain number of lead-in electrodes connected to each of the selected display segments need have their resistance values changed and no change of the display pattern or driving conditions is necessary. The resistance values of the certain number of lead-in electrodes changed to be smaller than any other lead-in electrodes which have no relation to the certain number of display segments.

In such a case, it may be unnecessary to form any cut-off portion in some lead-in electrodes, while the other lead-in electrodes may have cut-off portions formed therein. Otherwise, some cut-off portions, if formed, are formed within the certain number of lead-in electrodes smaller than those formed within the other lead-in electrodes.

In order to obtain a slow response time and/or a pale degree of coloration for only a certain number of display segments, on the contrary, the resistance values of only a certain number of lead-in electrodes may be made larger than those of the remaining lead-in electrodes.

For this purpose, the cut-off portions for the certain number of lead-in electrodes may have areas larger than the cut-off portions, if formed, within the remaining lead-in electrodes.

2. It is possible to obtain an improved ECD having a uniform background regardless of the presence of the lead-in electrodes, because of uniform formation of the lead-in electrodes as described hereinbelow.

With reference to FIG. 3, there are indicated electrochromic material films $4_1'$ to $4_7'$, lead-in electrodes $3_1'$ to $3_7'$, cut-off portions 10", a glass substrate 1, and a clearance 11.

On the glass substrate 1, the lead-in electrodes $3_1'$ to $3_7'$ are all disposed. The clearance 11 is present between each two adjacent lead-in electrodes $3_1'$ to $3_7'$.

Forming the lead-in electrodes may damage the visual display of a conventional ECD. More specifically, since the conventional ECD was vivid and had a background layer having a color of, say, white to provide a background for the display segments, the indication by the ECD was very bright. Therefore, the shape of the lead-in electrodes formed on the glass substrate were visible. The portions on which the lead-in electrodes were formed were slightly darker than the remaining portions on which the lead-in electrodes were not formed and therefore were noticed to be slightly whiter.

Therefore, it is preferable to obtain an improved ECD having a uniform background by forming the lead-in electrodes as described in connection with FIG. 3.

In FIG. 3, all the lead-in electrodes $3_1'$ to $3_7'$ are formed on the glass substrate 1 to cover the substrate 1 as widely as possible. The clearance 11 between at least two of the lead-in electrodes $3_1'$ to $3_7'$ becomes small enough to be neglected in a visual scale by the operator. The width of the clearance 11 is in the order of about 20 to about 40 μm. The cut-off portions 10" are formed within the lead-in electrodes $3_1'$ and $3_4'$ to adjust their resistance values as previously described. Since all the lead-in electrodes $3_1'$ to $3_7'$ cover the glass substrate 1 as widely as possible and, in addition, any clearance 11 between them is selected small enough to be neglected in the visual scale, the ECD provides the uniform background due to the arrangement of the lead-in electrodes $3_1'$ to $3_7'$.

While only certain embodiments of the present invention have been described, it will be apparent to those skilled in the art that various changes and modifications may be made therein without departing from the spirit and scope of the invention as claimed.

What is claimed is:

1. In an electrochromic display device including two substrates, display segments formed on one of said two substrates, a counter electrode formed on the other of said two substrates, and an electrochromic material for coloring said display segments upon receiving a predetermined current or voltage, the improvement comprising:

terminal means formed on said one of said two substrates for connecting the electrochromic display device to a driver circuit;

lead-in electrode means including a plurality of electrodes for connecting said display segments to corresponding terminal means;

said electrodes and display segments being formed on substantially the entire surface of said one of said two substrates, each said electrode covering a selected area portion of said one substrate;

at least one of said electrodes comprising means within its selected area portion for varying the electrical resistance of said at least one electrode.

2. In an electrochromic display device including two substrates, display segments formed on one of said two substrates, a counter electrode formed on the other of said two substrates, and an electrochromic material for coloring said display segments upon receiving a predetermined current or voltage, the improvement comprising:

terminal means formed on said one of said two substrates for connecting the electrochromic display device to a driver circuit; and lead-in electrode means including a plurality of electrodes for connecting said display segments to corresponding terminal means;

said electrodes and display segments being formed on substantially the entire surface of said one of said two substrates;

wherein at least one of said electrodes includes a cut-off portion not available for interconnection by which said at least one of said electrodes has a resistance value such that the product of said resistance value and the area of a corresponding one of said display segments is approximately equal to that produced by remaining couples of said electrodes and their corresponding display segments.

3. The electrochromic display device of claim 2, wherein there is a small amount of clearance between adjacent lead-in electrodes.

4. The electrochromic display device of claim 2, wherein said clearance is in the order of about 20 to about 40 μm.

5. An electrochromic display device comprising:

first and second spaced apart substrates;

display segments formed on one of said two substrates;

a counter electrode formed on the other of said two substrates;

electrochromic material for coloring said display segments upon receiving a predetermined current or voltage;

terminal means for connecting the electrochromic display device to a driving circuit; and a plurality of lead-in electrodes formed on said one of said two substrates, each of said electrodes electrically interconnecting a corresponding display segment to said terminal means, said display segments and lead-in electrodes collectively covering substantially the entire surface of said one of two substrates, at least one of said lead-in electrodes including means for varying the resistance of said electrode whereby said electrode has a resistance value inversely proportional to the area of its corresponding display segment.

6. The display device of claim 5 wherein said resistance varying means is a discontinuity reducing the effective conductivity of said electrode.

7. The display device of claim 5 wherein said resistance varying means is a non-conductive channel extending partially across said electrode in a direction generally transverse to the direction of current flow.

8. The display device of claim 7 wherein said non-conductive channel is formed in the shape of a hook.

9. The display device of claim 7 wherein said non-conductive channel is formed in the shape of a circle.

10. The electrochromic display device of claim 5, wherein said display segments define a seven segment numeral pattern, individual ones of said display segments varying in size.

11. An electrochromic display device comprising:

first and second spaced apart substrates;

display segments formed on one of said two substrates;

a counter electrode formed on the other of said two substrates;

electrochromic material for coloring said display segments upon receiving a predetermined current or voltage;

terminal means for connecting the electrochromic display device to a driving circuit; and lead-in electrodes for connecting said display segments to said terminal means;

said display segments and lead-in electrodes collectively covering substantially the entire surface of said one of two substrates;

said lead-in electrodes being shaped in such a manner as to have resistance values inversely proportional to the size of the corresponding display segments.

12. The display device of claim 11 wherein said lead-in electrodes are shaped by cut-off portions formed as discontinuities within said electrode.

13. The display device of claim 11 wherein said cut-off portion is a non-conductive channel extending partially across said electrode in a direction generally transverse to the direction of current flow.

* * * * *